SANFORD A. PARKER.
Improvement in Apparatus for Manufacturing Chocolate Drops, &c.

No. 119,946.

3 Sheets--Sheet 1.

Patented Oct. 17, 1871.

Witnesses,

Inventor,
Sanford A. Parker

3 Sheets--Sheet 2.
SANFORD A. PARKER.
Improvement in Apparatus for Manufacturing Chocolate Drops, &c.
No. 119,946.                    Patented Oct. 17, 1871.
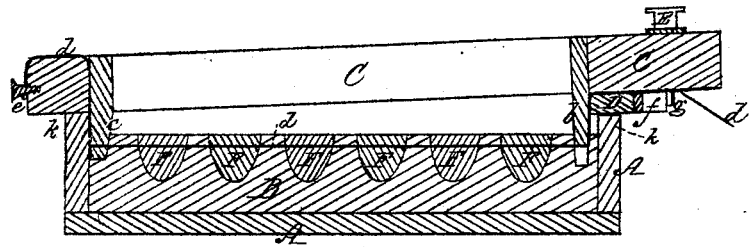
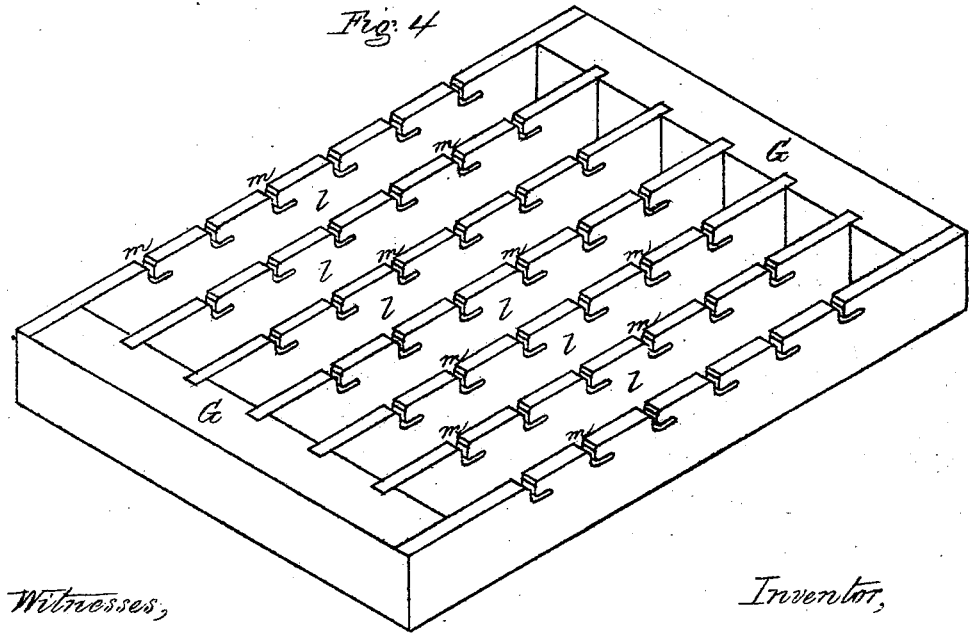
Witnesses,                      Inventor,

SANFORD A. PARKER.
Improvement in Apparatus for Manufacturing Chocolate Drops, &c.
No. 119,946.                 Patented Oct. 17, 1871.
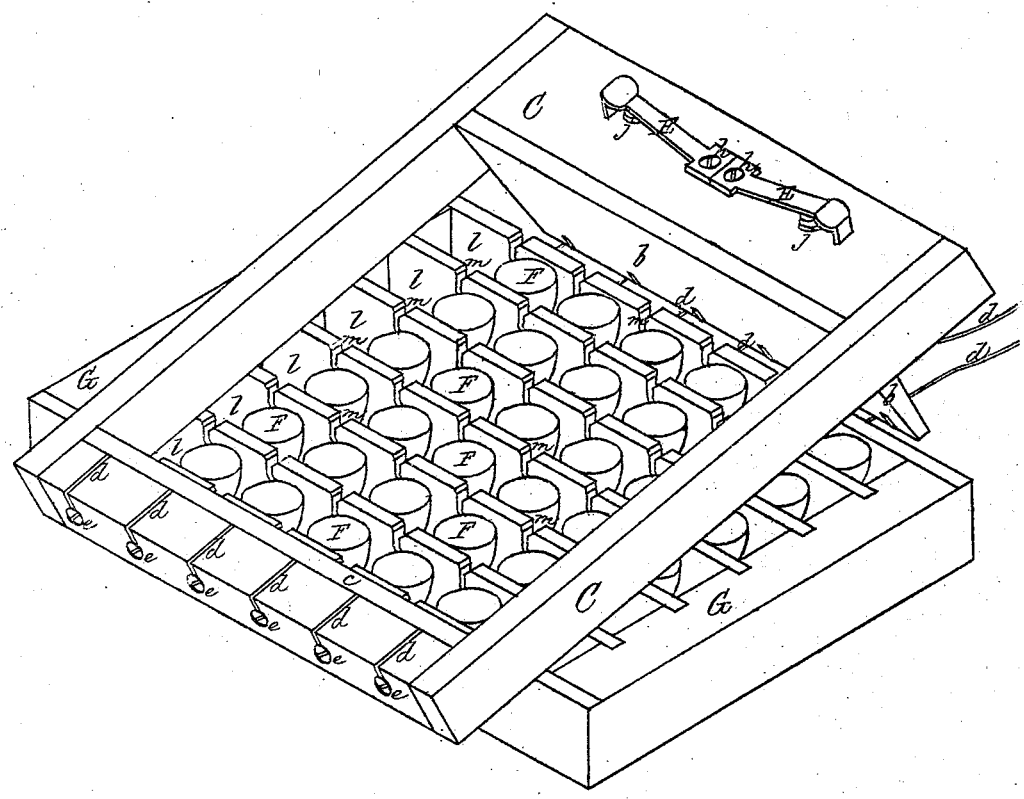
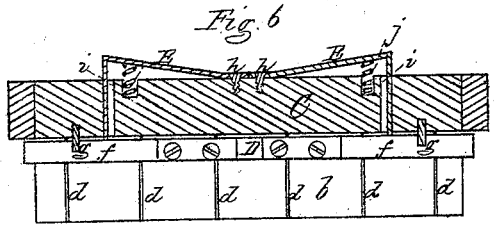
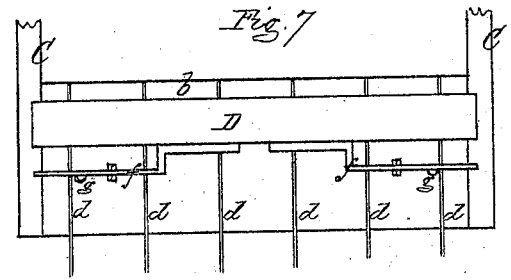

119,946

UNITED STATES PATENT OFFICE.

SANFORD A. PARKER, OF CAMBRIDGE, MASSACHUSETTS, ASSIGNOR TO HIMSELF AND FREDERICK G. CASS, OF SAME PLACE.

IMPROVEMENT IN APPARATUS FOR THE MANUFACTURE OF CHOCOLATE-DROPS AND OTHER CONFECTIONS.

Specification forming part of Letters Patent No. 119,946, dated October 17, 1871.

*To all whom it may concern:*

Be it known that I, SANFORD A. PARKER, of Cambridge, in the county of Middlesex and State of Massachusetts, have invented an Improved Apparatus for the Manufacture of Chocolate-Drops and other Confections, of which the following is a full, clear, and exact description, reference being had to the accompanying drawing making part of this specification, in which—

Figure 1:
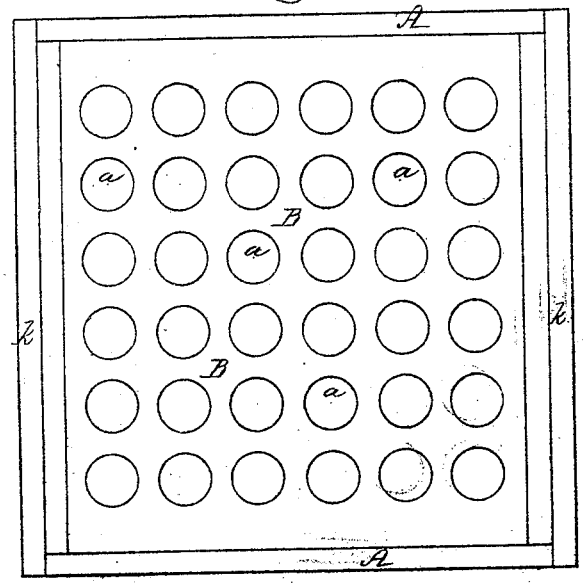
Figure 2:
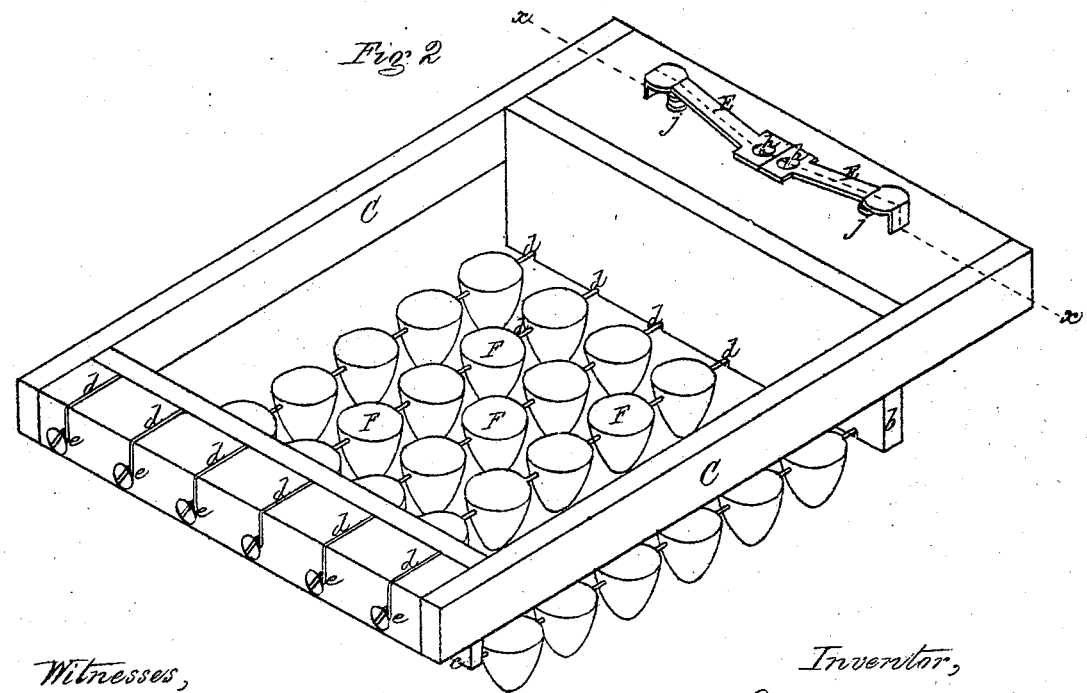

Figure 1 is a plan of a tray of starch with the molds formed therein. Fig. 2 is a perspective view of the frame and wires with the drops or confections thereon. Fig. 3 is a section through the molds and the frame with its wires, the drops being in place thereon. Fig. 4 is a perspective view of the "stripper." Fig. 5 is a perspective view illustrating the method of stripping or removing the drops from the wires. Fig. 6 is a section on the line $x\ x$ of Fig. 2. Fig. 7 is a plan of the under side of one end of the frame.

Apparatus for the manufacture of chocolate-drops and other confections have been provided with a board having a series of pins projecting from its under side with heads or enlargements on their lower ends. These pins have been inserted into the drops after they were cast in the molds and served to hold the drops after they were molded, so that they could be brushed and simultaneously dipped into the liquid chocolate or other mixture with which they were to be covered. This apparatus is, however, objectionable, as the pins leave holes of considerable size in the drops. Furthermore, the drops are liable to fall off the pins in brushing or dipping, and in dipping, the pin-board is between the operator and the pan containing the chocolate or other mixture, which prevents him from seeing if the operation is perfectly performed. My invention has for its object to overcome these difficulties; and consists, first, in a frame provided with a series of wires or strings, which are inserted into the starch in which the molds are formed, each wire extending across the series of molds in line therewith, the drops being cast upon the wires, or the wires being inserted in place after the drops are cast and before they become cool, by which arrangement, when the frame is removed, the drops will be strung upon the wires and held securely thereon so that they can be brushed and dipped with great facility, the operator being able to see distinctly if the dipping is perfectly performed. The second part of my invention consists in a stripper, to be used in connection with the above-described frame and wires, for the purpose of readily removing the drops or confections from the wires after they become cool.

To enable others skilled in the art to understand and use my invention, I will now proceed to describe the manner in which I have carried it out.

In the said drawing, A represents the tray which contains the pulverized starch B, in which the molds $a$ are formed in a well-known manner. C is a frame, which is provided with two plates, $b\ c$, which extend down below the frame, as seen in Figs. 2, 3, and 5. Between these plates $b\ c$, and across the frame C, is stretched a series of wires or strings, $d\ d$, one end of each wire being permanently secured at $e$, the other end being held fast by a clamping-bar, D, which, when removed, releases all the wires simultaneously at one end of the frame, for a purpose to be afterward described. The bar D is held in place by two springs, $f\ f$, attached thereto, which bear against pins $g\ g$ projecting from the frame C and press the inner side of the bar against the plate $b$. E E are two strips of metal, which are secured to the frame C at $h\ h$, the opposite ends of these strips being bent at right angles and passing down through holes $i\ i$ into contact with the springs $f\ f$, and thus when the strips E E are pressed down against the resistance of springs $j\ j$ the springs $f\ f$ will be forced away from the pins $g\ g$ and the bar D will fall off, releasing the ends of the wires $d\ d$, as required. The molds having been formed in the starch, as seen in Fig. 1, the frame C, with its wires $d\ d$, is placed over it, as seen in section, Fig. 3, the wires extending across the molds and sinking into the starch between them, which closes up over the wires, or leaves spaces so small that the liquid sugar will not run into them. The ends of the frame C rest against the elevated sides $k\ k$ of the starch-tray A and serve as gauges to prevent the wire from descending too far into the molds, thus insuring the drops F being held upon the wires in such a position that when dipped into the liquid they will be entirely covered thereby. The frame C with its wires being in place, the drops or confections are cast in the molds around the wires, and after the drops become cool the frame is raised and removed, the drops F being lifted out of the molds by the wires, upon which they remain strung, as seen in Fig. 2. Instead of placing the frame C with its wires over the molds previous to casting the drops the drops may first be cast and the frame with its wires placed over them while still hot, the wires sinking down into the drops, which close over them, so that when they are removed they will be strung upon the wires in the same manner as if they had been cast around them. The drops are now brushed to remove any starch which may adhere thereto, after which they are all simultaneously dipped into the liquid chocolate or other mixture with which they are to be covered by lowering the frame until the drops are entirely submerged, after which they are removed and allowed to drain and become cool. During the process of dipping the view of the operator is not obstructed, as is the case when a pin-board is used, and he can consequently see at once if all of the drops upon the wires are properly submerged in the liquid.

I will now describe the manner in which the drops are stripped or removed from the wires $d$ $d$. G is a frame, across which extends a series of division-plates, $l\,l$, each of which is provided with a series of open slots, $m$, the number of slots in each plate corresponding to the number of wires $d$ on the frame C. The frame C, with its wires and drops, as seen in Fig. 2, is now placed upon the frame G, the wires descending into the slots $m$, and the drops remaining between the division-plates $l$. The frame is then moved a little sidewise to bring the wires into the horizontal portions of the slots $m$, by which they are locked in place and prevented from rising up. The ends of the wires $d\,d$ are then released by pressing with the thumbs upon the strips E E, and the frame C is raised up at one end, as seen in Fig. 5, after which it is drawn back, causing the wires to be pulled through the drops, which then fall down between the division-plates $l\,l$ into a receptacle placed beneath to receive them. The loose ends of the wires $d\,d$ are then secured in place and the frame C is again ready for use. The holes made in the drops by the wire are so small that they can hardly be discerned, and they are consequently not injured or disfigured thereby, while there is no liability of the drops becoming accidentally detached from the wires while being brushed or dipped.

I do not confine myself to the use of the above-described device for holding and releasing the ends of the wires $d\,d$, as any other suitable means may be employed for the purpose, and instead of the slots $m$ some other device may be used for holding down the wires $d\,d$ while the drops are being stripped therefrom.

What I claim as my invention, and desire to secure by Letters Patent, is—

1. The frame C with its wires $d\,d$, operating substantially in the manner and for the purpose set forth.

2. The stripper G with its division-plates $l\,l$ and slots $m$ or equivalent device for holding down the wires $d\,d$, in combination with the frame C and its wires $d\,d$, operating substantially in the manner and for the purpose described.

Witness my hand this 6th day of September, A. D. 1871.

SANFORD A. PARKER.

Witnesses:
P. E. TESCHEMACHER,
W. J. CAMBRIDGE. (155)